March 16, 1971 J. R. GOLDEN 3,570,146
SYSTEM FOR AUTOMATICALLY TESTING APPLICANTS
Filed July 3, 1969 2 Sheets-Sheet 1
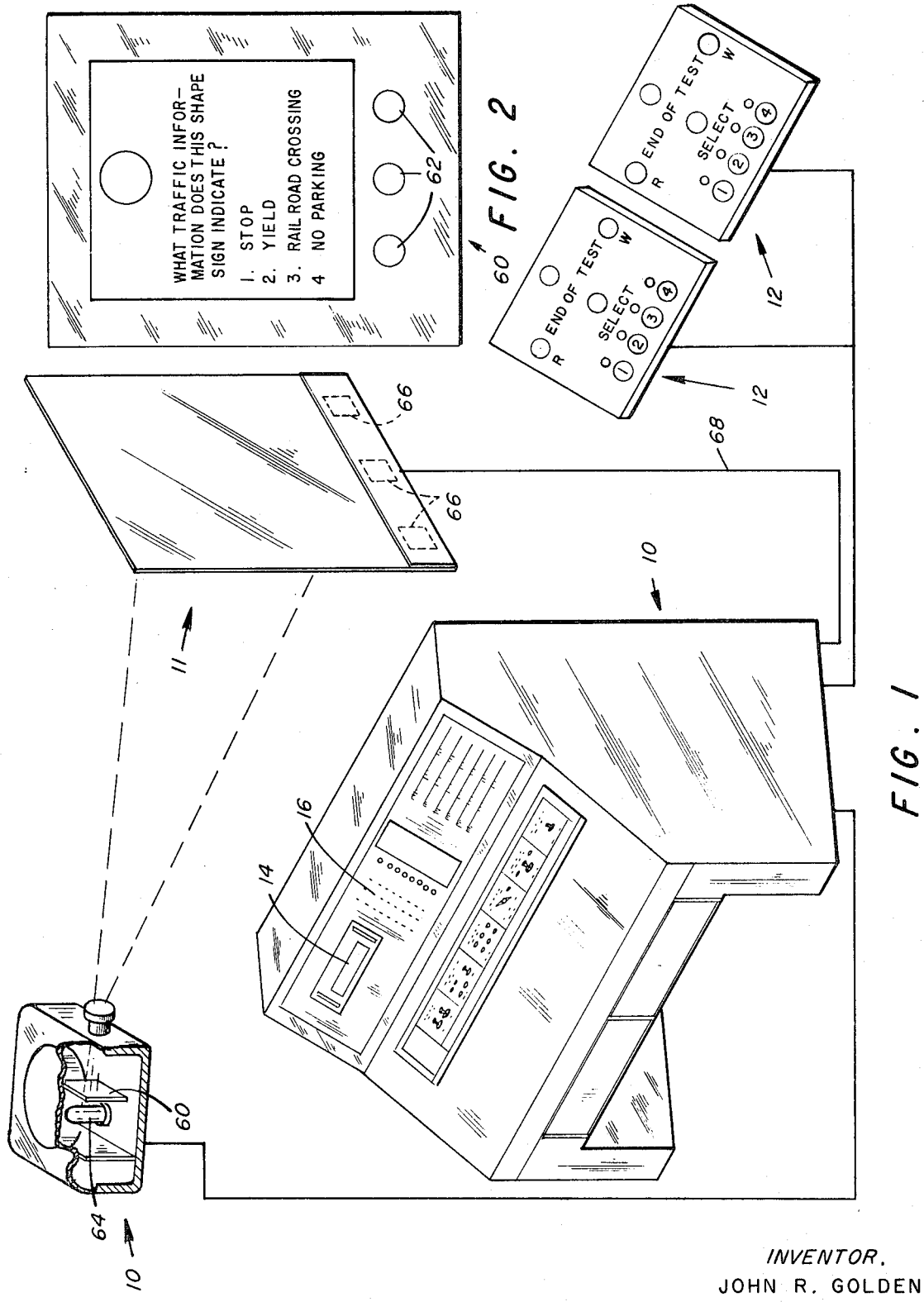
INVENTOR.
JOHN R. GOLDEN
BY
Head & Johnson
ATTORNEYS

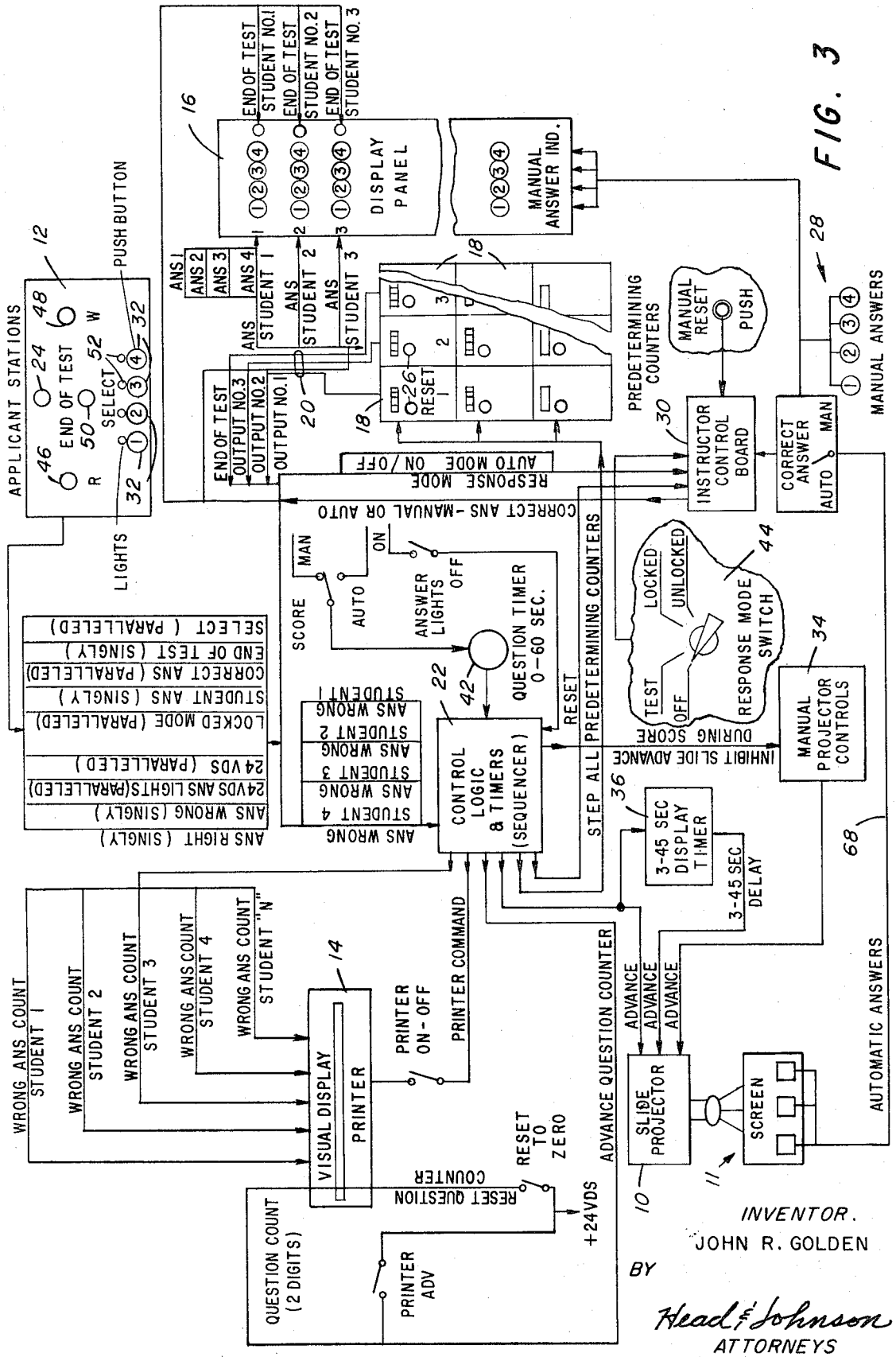

United States Patent Office 3,570,146
Patented Mar. 16, 1971

3,570,146
SYSTEM FOR AUTOMATICALLY TESTING APPLICANTS
John R. Golden, Tulsa, Okla., assignor to Gemco, Inc., Tulsa, Okla.
Filed July 3, 1969, Ser. No. 838,790
Int. Cl. G09b 7/06
U.S. Cl. 35—48                              5 Claims

ABSTRACT OF THE DISCLOSURE

This invention relates to a system for automatically testing applicants. More particularly, the invention relates to a system for automatically testing applicants, including a projecting means for sequentially displaying test questions or a scene or situation to which the questions relate, each test question displaying simultaneously a plurality of answers, all but one of which are incorrect, a plurality of applicant stations having provisions for indicating a selection of each of the possible answers to each question, means of recording the response given by each applicant, and means of automatically disabling applicant stations individually, each at the termination of a preselected number of questions presented, thereby enabling applicants to begin and end test sessions at staggered periods.

CROSS-REFERENCE

This disclosure is not related to any pending United States or foreign patent application.

BACKGROUND, SUMMARY AND OBJECTS OF THE INVENTION

In recent years, greatly increased interest has been demonstrated in improving the efficiency and effectiveness of teaching and evaluating students and applicants. One of the areas of great interest at the present time is that of effective evaluation of drivers to enable rapid testing of applicants for drivers licenses, or for renewal of drivers licenses, to ascertain general knowledge of facts and law concerning safe driving of vehicles on public roads and thoroughfares.

Others have provided machines and devices for testing applicants which have greatly contributed to the technology of testing and are greatly superior to the original means, which is sometimes still in use today, of giving applicants tests on paper, the papers being individually graded by a monitor. One problem, however, which has existed with automatic machine or apparatus testing procedures up to the present time, is that such machines and procedures have normally required applicants to take tests in groups with all the applicants making up a group required to begin and end the test at the same time. While this arrangement is completely satisfactory for organized educational procedures, such as classroom teaching arrangements, it is burdensome to those engaged in evaluation of large numbers of people, such as is encountered in testing of drivers for the issuance of new or the renewal of drivers licenses. With apparatus or systems requiring all the applicants in each group to being at once the test cannot begin until the last applicant of the group is in position and ready. This invariably means that most of those making up the group are required to waste time waiting for the last to arrive. It further means that only a given number of groups can be scheduled in each day. In addition, it requires applicants to be present at preselected times, calling for complicated scheduling procedures.

This invention overcomes the disadvantages with other systems by providing a system for automatically testing applicants in which applicants may present themselves at various times to begin testing without the necessity of prearranging groups to begin and end the tests at the same time.

The system of this invention provides immediate feedback to the applicant of the correct answer and therefore provides the additional service of training so that even on those questions which he may miss the correct answer may be more readily retained in his memory.

More particularly, this invention provides a system for automatically testing applicants in which questions are projected for viewing by a multitude of applicants, each of the applicants being assigned a station having means of indicating the applicant's selected answer and including means whereby applicants can begin tests at various times and including means of automatically terminating the test as to each applicant when each such applicant has finished a preselected number of questions.

These general objects as well as more specific objects of the invention will be understood with reference to the following description and claims, taken in conjunction with the drawings.

DESCRIPTION OF THE DRAWINGS

FIG. 1 is a pictorial representation of the basic portions of the system embodying the invention.

FIG. 2 is a typical slide showing a question and answer which is projected for viewing by applicants and showing means for keying the correct answer to the system logic circuits.

FIG. 3 is a schematic arrangement of an embodiment of the system of this invention.

DETAILED DESCRIPTION

The physical apparatus encompassing the system of this invention is shown in FIG. 1 and may be divided into three portions. The first portion includes a projecting means, such as a slide projector 10, which projects questions and a scene, diagram or situation related to the question, and a plurality of answers onto a screen 11 in view of all of the applicants being tested. The second portion includes a plurality of applicant stations 12, only two of which are shown, it being understood that in practice of the invention there may be as many applicant stations 12 as desired. In a typical installation there is usually between eighteen and forty applicant stations 12.

The third basic portion of the apparatus making up the invention is the control, logic, and recording apparatus which is usually incorporated in a monitor's console 13 which may be in the form of a desk or podium arrangement. All of the equipment necessary for practicing the invention except for the projector 10, screen 11, and applicant stations 12 is normally housed in the monitor's console 13.

Referring to FIG. 3, a schematic arrangement of the invention is shown. The monitor's console 13 includes a visual display printer 14 which prints sequentially the number of each question and the response given by each applicant. While the printer 14 may be arranged in a variety of configurations the typical arrangement includes a printing device including one line of printing for each question presented with multiple columns, the first two columns showing the number of the question presented and the subsequent columns showing the applicant's responses. In one embodiment of the invention the responses are printed by recording only the giving of an incorrect answer by an applicant, that is, when a correct answer is given, no indication appears in that applicant's column on the line of that question. Thus the monitor can grade an applicant's test by merely noting the number of incorrect answers appearing on the record produced by printer 14.

In addition, the console may include, as an optional although highly preferred feature, a display panel 16. Panel 16 includes a line of lights for each applicant station 12, there being columns of lights according to the number of possible answers for each question. In a typical arrangement, as illustrated, four answers are presented for each question, thus there are four columns of lights for each question. By observing the lights on display panel 16, the monitor can determine quickly which applicants have incorrectly answered a given question and thereby evaluate the overall performance of the group being tested.

The system includes a predetermining counter 18 for each applicant station 12. Counters 18 are automatically stepped down as each question is presented. The predetermining counters 18 may be preset to any desired number and they will then count from that number to zero. Upon reaching zero, a switch closure signals the completion of the predetermined number of questions. When the preselected number of steps have occurred in any given counter, a signal is given by way of one of the conductors 20 to a control logic assembly 22 to disable the applicant station 12 associated with that counter 18. When an applicant station 12 is disabled, a light 24 appears at the applicant station so that the applicant is advised that his test is terminated. In addition, the applicant station 12 is disconnected or disabled, by the control logic assembly 22, so that no further answers are transmitted to that station's counter 18. At the same time, on display panel 16 a light appears advising the monitor that the end of test has occurred for that applicant station. Each of the counters 18 include a reset control 26 which, when manually depressed by the monitor, resets that counter and enables the applicant station 12 associated with such counter to respond to questions presented. When the counter 18 is reset the associated printer wheel is automatically reset to zero.

If desired, the monitor may set the correct answer manually by means of switch buttons 28 to each question presented. A switch is provided to select the manual or automatic answer mode. When an answer is set manually the answer is conveyed by way of the instructor control board 30 and through control assembly 22 to each applicant station 12. In the applicant station the closing of the switch by the applicant, such as by depressing an answer button 32, will, if the correct button is not depressed, provides an incorrect answer signal which is recorded by printer 14.

Projector 10 may be automatically advanced by signal from the control assembly 22 or manually by the monitor utilizing projector control 34. A selectable question timer 42 is incorporated in the circuit and may be utilized to preselect the duration of display of each question. The question timer 42 may be utilized whether the projector is advanced automatically or manually. In a typical application the question displayed by slide projector 10 may be selected to last for a period of approximately three seconds, to a maximum period of sixty seconds. When the monitor desires the questions to be automatically advanced, switch 40 enables the question timer 42 to sequentially step the system which includes stepping the slide projector 10. Display timer 36 may be utilized to preselect the time lapse between each question. This display timer 36 may more correctly be called the correct answer display timer, as it determines the time during which the number of the correct answer is displayed. During this display time all responders are locked.

OPERATION

When a test to a group is to begin, the monitor assigns stations 12, one applicant to each station. The monitor then depresses the reset button 26 on each of the counters 18 associated with each of the applicant stations 12 being utilized. The control switch 44 is then turned to the test position. With score switch 40 in the automatic position, projector 10 will be actuated to display a slide presenting a question and four possible answers. Each applicant will depress one of the buttons 32 according to the answer he selects. The answer of each applicant will appear on the display panel 16. At the same time, if an applicant gives a wrong answer, it is recorded for that applicant station in the proper column on printer 14. At the same time the counter 18 will count down one for each applicant station in use. At the expiration of the time period set by display timer 42, projector 10 withdraws the display of the question and answers and, after the period set by timer 42, the projector 10 is advanced and the next slide is shown. Here the correct answer in numeral form is displayed to the applicants. This display time is controlled by timer 36. At score time, the correct-incorrect answer lights on each hand unit light also if turned on. Again, after the period of time controlled by timer 36, projector 10 is advanced and the next slide is shown. The applicants make their selection and any incorrect answers are recorded. The sequence automatically continues when the system is in the total automatic mode.

In the typical arrangement, projector 10 may be equipped to display sequentially a total of, by way of example, eighty slides, each presenting a different question and different set of answers. In the typical evaluation, each applicant may be required to respond to only part of the total possible questions, such as thirty questions.

After the evaluation of a group has begun, if a new applicant arrives he is assigned by the monitor to an applicant station 12 and the reset switch 26 is depressed for the counter 18 associated with that station. Thus the new applicant responds to the next presented question the same as the previous applicants who have already responded to previous questions.

As additional applicants arrive they are assigned to applicant stations and their stations enabled by the monitor depressing switch 26 on the appropriate counters 18.

The test continues with sequential questions presented by projector 10. When the first group of applicants reach the preselected number of questions (such as thirty) constituting a full test, counters 18 provide signals on appropriate conductors 20 which disable their applicant stations 12. This disabling signal is indicated by light 24 at applicant station 12 and also by a light on display panel 16. The applicant then knows his evaluation has been completed. The projector 10 will continue to sequentially advance but the applicant at his station which has been disabled can no longer respond. His evaluation is indicated by the number of incorrect answers recorded on printer 14.

In the automatic score mode the projector 10 continues to sequentially display the series of questions and answers indefinitely. As a new applicant arrives he is assigned a station and he responds to the next sequence of questions and answers presented. Thus each applicant is examined only for the same number of questions, although the questions will be different according to the time of beginning of each applicant.

If desired, an indication may be given to each applicant as to whether his selected answer was correct or incorrect by means of lights 46 and 48 at each applicant station 12. In addition, a light 50 may be provided to indicate a time for the applicant to select an answer, the light 50 being extinguished once an answer is selected. Small lights 52 above each answer button 32 indicate to the applicant the answer he has selected.

When response mode switch 44 is in the locked position, an applicant can present only one answer to each question and cannot change his answer. When the response switch 46 is in the unlocked position, the applicant has the privilege of selecting a subsequent answer if his previous answer is incorrect. The unlocked position is normally utilized when the system is being used for educational purposes rather than purely for evaluation or testing purposes.

The coordination of the correct answer signal to the control and logic circuits may be accomplished in a variety of ways. One arrangement is illustrated in FIGS. 1 and 2. FIG. 2 shows a typical slide 60. In addition to a question and multiple answers, which are projected onto screen 11, along the lower edge of the slide 60 are punched answer windows 62. Light from the projector bulb 64 passes through window 62 which has been punched. Each of three positions may be punched or unpunched. On the back of screen 11 are three light sensitive cells 66 positioned to receive light passing through windows 62. The light sensitive cell 66 provides a binary coded signal identifying an answer (number 4 in FIG. 2) as the correct answer. This binary signal is transmitted to the system logic circuits 22 in console 10 by way of cable 68. By this arrangement the correct answer is fed to the system logic circuits for each slide presented. Only that portion of slide 60 within the outline is projected on screen 11 so that no indication is given on the screen of the correct answer.

As previously indicated, the system of this invention may be used both for testing and instructing applicants, the word "testing" being used herein in the broadest sense. In addition to displaying written questions, a scene or situation to which questions relate may be displayed and the expression "test questions" is inclusive of such arrangement.

The invention has been described as it relates to the use of a single projector. In another embodiment, two projectors may be utilized directed to two adjacent screens or to different portions of the same screen. Two projectors may be utilized in one or two modes. The first mode is the sequenced mode. In this mode, projector one displays the question to be answered and projector two displays a situation, scene, or diagram to which the question is related. Projector two also has the correct answer information punched into its periphery. After the completion of the time allotted to the question to be answered, projector one (only) sequences to a new slide. This new slide may contain the same question as the first slide with the addition of the correct answer information. That is, the correct answer may be circled or otherwise indicated to the applicants such that they receive feedback on the question and know the correct answer. At the same time, the correct answer is also displayed by a lighted number at the bottom of the display screens. After a period of time determined by the correct answer display timer, both projectors one and two advance to the next question with the corresponding situation being shown on projector two. The other mode of operation is where both projectors are advanced simultaneously. In this mode of operation, both projectors advance once for each question asked. The only correct answer feedback given the applicants is the numerical indicator at the bottom of the screen. In the simultaneous mode of operation it is unimportant as to which projector displays the questions and which projector displays the situations.

The invention provides a unique means for evaluating large numbers of people. Particularly, the invention provides an arrangement permitting applicants to arrive and depart at different times without the necessity of organizing groups. The system provides great economy in that individual applicants can start and stop at different times but in an arrangement utilizing a central evaluating facility including only one projecting arrangement for displaying questions and answers. Thus, means is provided for evaluating large numbers of people at a minimum of expense for systems and equipment and utilizing the minimum number of supervisory or monitor personnel.

While the invention has been described with a certain degree of particularity, it is manifest that many changes may be made in the details of construction and arrangement of components without departing from the spirit and scope of this disclosure.

What is claimed:

1. A system for automatically testing applicants comprising:
a projecting means for sequentially displaying, one at a time, test questions or displays to said applicants, each test question displaying simultaneously a plurality of answers each identified by a symbol, all but one of such answers displayed with each of such questions being incorrect;
a plurality of applicant stations each consisting of a signaling means for each possible answer presented for each question, each signaling means being identified by a symbol corresponding with a symbol identifying one of the displayed answers;
means of recording the response given at each applicant station for each question presented;
means of separately enabling each applicant station to thereby permit applicants to begin tests at different times; and
means of automatically disabling each applicant station individually at the termination of preselected number of questions presented by said projecting means after such particular applicant station is enabled to thereby permit the answering of the same preselected number of questions at each application station; such preselected number being less than the total number of different questions being sequentially displayed by said projecting means.

2. A system for automatically testing applicants according to claim 1 wherein said means of recording the response at each applicant station for each question presented includes recording only incorrect answers given.

3. A system for automatically testing applicants according to claim 1 including means of automatically sequentially displaying test questions by said projecting means at preselected spaced intervals.

4. A system for automatically testing applicants according to claim 1 including means at each of said applicant stations of automatically indicating the end of test when each of such applicant stations is disabled.

5. A system for automatically testing applicants according to claim 1 including means at each of said applicant stations of automatically indicating the correctness or incorrectness of the response given by each applicant to each question presented by said projecting means.

References Cited
UNITED STATES PATENTS

| | | | |
|---|---|---|---|
| Re. 23,030 | 8/1948 | Holt | 35—9X |
| 3,195,403 | 7/1965 | Ascanio et al. | 35—9X |
| 3,199,230 | 8/1965 | Sylvester et al. | 35—48 |
| 3,300,876 | 1/1967 | Johannsen | 35—9 |

WILLIAM H. GRIEB, Primary Examiner

U.S. Cl. X.R.

35—9